US012379947B2

(12) United States Patent
Paini et al.

(10) Patent No.: US 12,379,947 B2
(45) Date of Patent: Aug. 5, 2025

(54) METHOD FOR DYNAMIC AI SUPPORTED GRAPH-ANALYTICS SELF LEARNING TEMPLATES

(71) Applicant: Bank of America Corporation, Charlotte, NC (US)

(72) Inventors: Siva Paini, Telangana (IN); Sakshi Bakshi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 366 days.

(21) Appl. No.: 17/979,366

(22) Filed: Nov. 2, 2022

(65) Prior Publication Data

US 2024/0143355 A1    May 2, 2024

(51) Int. Cl.
*G06N 3/10* (2006.01)
*G06F 3/0481* (2022.01)
*G06F 9/451* (2018.01)

(52) U.S. Cl.
CPC ............ *G06F 9/453* (2018.02); *G06F 3/0481* (2013.01); *G06N 3/10* (2013.01)

(58) Field of Classification Search
CPC .......... G06F 9/453; G06F 3/0481; G06N 3/10
See application file for complete search history.

(56) References Cited

U.S. PATENT DOCUMENTS

| | | | |
|---|---|---|---|
| 9,430,557 B2 | 8/2016 | Bhat et al. | |
| 11,449,681 B2 | 9/2022 | Avshalomov et al. | |
| 2009/0198727 A1* | 8/2009 | Duan | G06F 16/213 |
| | | | 707/999.102 |
| 2012/0179958 A1* | 7/2012 | Tarjan | G06F 40/186 |
| | | | 709/204 |
| 2016/0027125 A1 | 1/2016 | Bryce | |
| 2016/0180881 A1* | 6/2016 | Vilrokx | G11B 27/102 |
| | | | 386/241 |
| 2017/0102693 A1 | 4/2017 | Kidd et al. | |
| 2017/0124061 A1 | 5/2017 | Amerige et al. | |
| 2018/0063602 A1* | 3/2018 | Kalish | H04N 21/47202 |
| 2019/0369607 A1 | 12/2019 | Enver et al. | |
| 2020/0334416 A1 | 10/2020 | Vianu et al. | |
| 2021/0306691 A1* | 9/2021 | Thomas | G06F 16/738 |

(Continued)

OTHER PUBLICATIONS

Nov. 21, 2024—(US) Notice of Allowance—U.S. Appl. No. 17/979,333.

(Continued)

*Primary Examiner* — Keith D Bloomquist
(74) *Attorney, Agent, or Firm* — Banner & Witcoff, Ltd.

(57) ABSTRACT

Methods and systems described herein for addressing issues associated with varying graph analytics tools that require different tool-specific coding languages. An artificial intelligence (AI) sub-system of various modules extracts metadata from a dataset and identifies nodes and relationships in the dataset using the metadata. The dataset is matched with a corresponding graph-analytics template in a data store, and a dynamic template modifier modifies the corresponding graph-analytics template. In some examples, the AI system generates smart guided videos with logical breakpoints that are embedded along with templates for quick learning and to build faster graphical analytics. The AI system includes a dynamic template modifier and a cognitive smart AI engine that includes a graph.

20 Claims, 8 Drawing Sheets

(56) References Cited

U.S. PATENT DOCUMENTS

| | | | |
|---|---|---|---|
| 2021/0365643 A1* | 11/2021 | Agrawal | G06N 20/00 |
| 2022/0179910 A1 | 6/2022 | Bharathy et al. | |
| 2022/0310083 A1 | 9/2022 | Mohanty et al. | |
| 2023/0205158 A1* | 6/2023 | Ramanasankaran | G06F 16/9024 |
| | | | 700/28 |
| 2023/0236857 A1* | 7/2023 | Ferrucci | G06F 40/205 |
| | | | 707/723 |
| 2024/0134847 A1 | 4/2024 | Mujica-Parodi, III et al. | |

OTHER PUBLICATIONS

Oct. 9, 2020—Rossi et al., "Temporal Graph Networks for Deep Learning on Dynamic Graphs", Erossi@twitter.com.

Nov. 19, 2021, Cong et al., "Dynamic Graph Representation Learning Via Graph Transformer Networks," Facebook, pp. 24.

* cited by examiner

METHOD FOR DYNAMIC AI SUPPORTED GRAPH-ANALYTICS SELF LEARNING TEMPLATES

BACKGROUND

Graph Analytics makes analysis easier and dynamic for end user. However, different graph analytics tools require tool specific coding languages to develop the underlying code and for new users it may be time consuming. It also needs extensive data knowledge to identify nodes and relations from the given datasets. Most of these tools are licensed and not compatible with each other. This makes analytics expensive and require extensive coding experience for underlying functionality creation and maintenance.

Meanwhile, machine learning has enabled the automated processing of problems formerly limited to human intervention. Traditionally, computers have been explicitly programmed to perform tasks, meaning that even fairly simple tasks can take significant amounts of programming time to implement. Machine learning may be used to allow a computer to perform the same or similar tasks without being explicitly programmed to do so. Machine learning has benefits far beyond programming efficiency: machines may also learn and identify correlations in data that would otherwise go undetected if reviewed by humans. While a human would be unlikely to detect such a correlation given the volume of data involved and a lack of a motivation to compare such datasets, a machine learning algorithm may do so largely without human intervention. Machine learning algorithms are asked to label data in large data sets. However, machine learning is not without its shortcoming. One or more disadvantages in prior art systems could be improved.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues associated with varying graph analytics tools that require different tool-specific coding languages. With the certainty that logical aspects of data analysis remain constant even though their syntaxes and coding languages changes and considering the prominent industry domains and regular analytical requirements, predefined template skeletons with dynamic nodes and guided videos are created as a solution. These analytics templates are hashed to group them logically and quick extraction. Smart AI engine identifies the nodes and relationships from given datasets and uses customizable interactive user sessions every step of the way to modify actions. Smart BERT based Transformer engine identifies the tool specific language and modify the template code to sync up with tool specific code for seamless template adoption by the tool in use. The dynamic template modifier enables the relevant template selection or modification and embeds the data for the customized graph to be downloaded for offline analytics without the tool in defined format. Smart Guided videos, restricted to screen specific, with logical breakpoints are embedded in utility along with templates for quick learning and to build faster graphical analytics. These and additional aspects will be appreciated with the benefit of the disclosures discussed in further detail below. Moreover, the figures herein illustrate the foregoing embodiments in detail.

In one embodiment, a "Method for Dynamic AI Supported Graph-Analytics Self Learning Templates" is labeled as Ser. No. 17/979,333. The embodiment is directed to a novel method and system for a vendor-agnostic graph analytics engine that uses a cognitive AI engine, which is built upon a BERT-based (bidirectional encoder representations from transformers) AI transformer, to generate dynamic nodes in a graph using templates and hashing by logical groups.

In another embodiment, a "Method for Dynamic AI Supported Graph-Analytics Self Learning Templates" (Smart Guided Video Media) is labeled as Ser. No. 17/979,366. The embodiment includes separate/numerous steps to generate a novel, smart guided video media with logical breakpoints enabling explainable AI for audit and troubleshooting. This smart guided video uses a novel logical grouping of nodes in the graph to generate an actual video media that explains the evolution of the outputted results of the AI/BERT transformer so that the framework is self-serviceable and auditable for AI bias.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
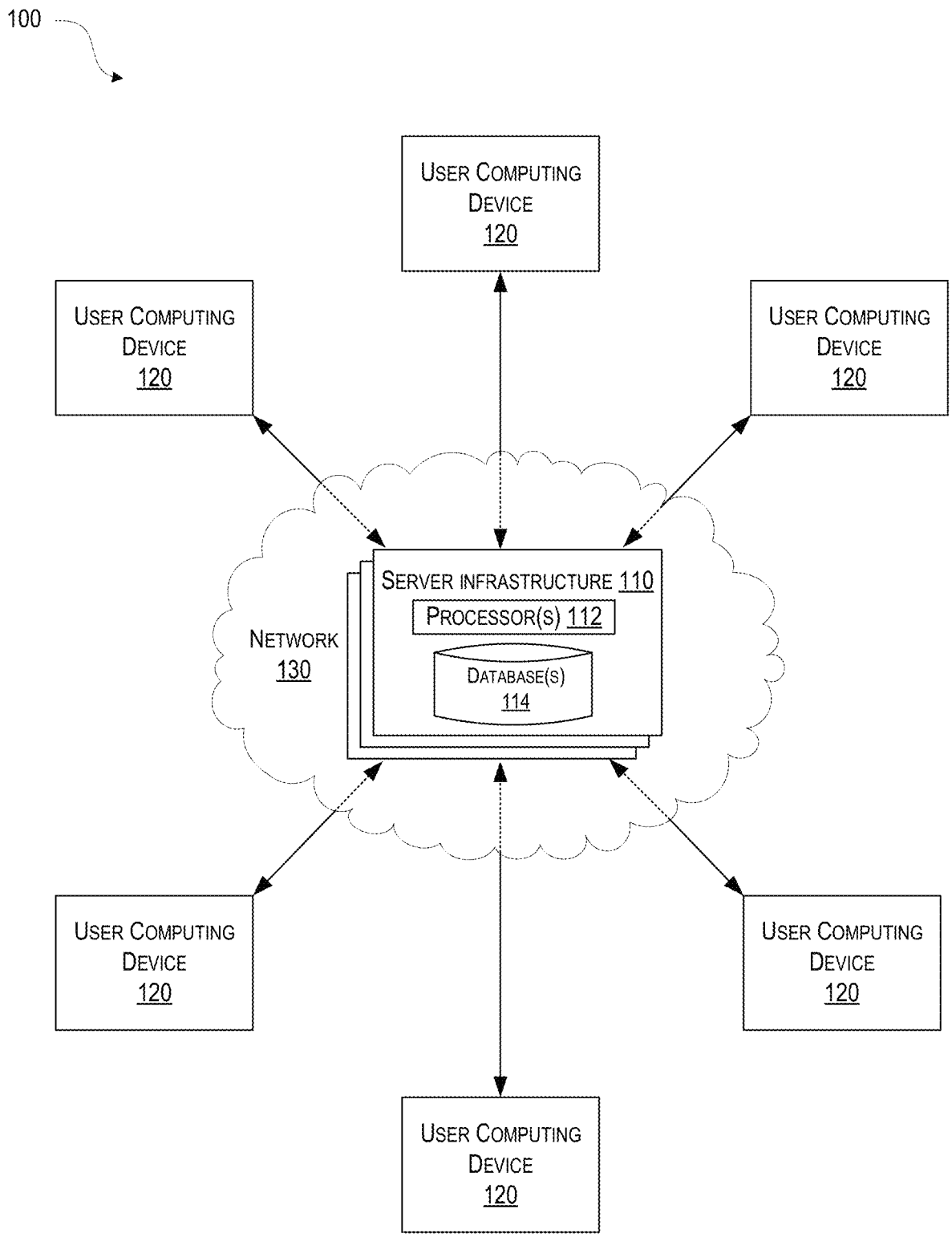
FIG. 1 depicts an illustrative example of a computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As a general introduction to the subject matter described in more detail below, aspects described herein are directed towards the methods and systems disclosed herein.

Aspects of this disclosure provide effective, efficient, scalable, and convenient technical solutions that address various issues associated with varying graph analytics tools that require different tool-specific coding languages. For example, the system may be agnostic to graphing vendors. Illustrative systems are disclosed comprising a sub-system of various modules, and one or more data stores keeping a plurality of predefined graph-analytics templates. The sub-system may extract metadata from a dataset and identify nodes and relationships in the dataset using the metadata. The dataset may be matched with a corresponding graph-analytics template and then a module comprising a dynamic template modifier may modify the corresponding graph-analytics template. Notably, at least one node in the dataset is a dynamic node in contrast to a node type of static. In some examples, the dataset may comprise data both from multiple sources and of different types.

With the certainty that logical aspects of data analysis remain constant even though their syntaxes and coding languages changes and considering the prominent industry domains and regular analytical requirements, predefined template skeletons with dynamic nodes and guided videos are created as a solution in one embodiment. In some illustrative embodiments, the sub-system of modules may comprise a data analyzer and node-relationship formation layer configured to extract metadata from a dataset, and a cognitive smart AI engine configured to identify nodes and relationships in the dataset using the metadata.

In the sub-system of modules, the cognitive smart AI engine may comprise a BERT AI transformer configured to identify tool-specific syntax. A smart (Bidirectional Encoder Representations from Transformers) BERT based Transformer engine identifies the tool specific language and modify the template code to sync up with tool specific code for seamless template adoption by the tool in use. The dynamic template modifier enables the relevant template selection or modification and embeds the data for the customized graph to be downloaded for offline analytics without the tool in defined format. In some examples, the BERT AI transformer may be further configured to analyze the dataset bidirectionally from right-to-left and left-to-right. And further in some examples, such bidirectional analysis may be performed in real-time.

These analytics templates may be hashed to group them logically and to enable quick extraction. Smart AI engine identifies the nodes and relationships from given datasets and uses customizable interactive user sessions every step of the way to modify actions. Such a cognitive smart AI engine may comprise, in some examples, a natural language processing (NLP) engine configured to clone and assist the dynamic template modifier for self-learning. In some embodiments, the cognitive smart AI engine comprises a rules engine that takes into consideration a history of existing graph-analytics templates to improve self-learning by the system. The hashing, by logical group of each of the plurality of predefined graph-analytics templates, may be stored in one or more data stores. Moreover, the hashing improves the matching performed by the dynamic template modifier.

In addition, aspects of this disclosure provide effective, efficient, scalable, and convenient technical solutions that address various issues associated with varying graph analytics tools that require different tool-specific coding languages. Illustrative systems are disclosed that generate smart guided videos, restricted to screen specific, with logical breakpoints that are embedded in utility along with templates for quick learning and to build faster graphical analytics. Such a system may comprise both a video file creation module and a sub-system, which comprises a dynamic template modifier and a cognitive smart artificial intelligence (AI) engine. The cognitive smart AI engine may include a graph.

The video file creation module may be configured to generate a smart guided video and associate the smart guided video with the identified graph-analytics template. In some examples, the smart guided video may include logical breakpoints that enable AI auditing and troubleshooting of the cognitive smart AI engine. The video file creation module may be part of a greater, media file creation module. For example, the smart guided video may comprise a step-by-step visual explanation of an AI transformer associated with the graph, or in some examples, of a sub-system comprising the cognitive smart AI engine. In other examples, the media file creation module may generate visual output without audio output—e.g., a visual workflow explanation. In other examples, the video/media file creation module may be configured to create a video media file that automatically explains formation of the graph. The file creation module may also logically group nodes in the graph.

FIG. 1 depicts an illustrative example of computer system 100 in accordance with one or more illustrative aspects described herein. Computer system 100 may comprise one or more computing devices including at least server infrastructure 110 and user computing devices 120. Each of user computing devices 120 may be configured to communicate with server infrastructure 110 through network 130. In some arrangements, computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, computer system 100 also may include one or more networks, which may interconnect one or more of server infrastructure 110 and one or more user computing devices 120. For example, computer system 100 may include network 130. Network 130 may include one or more sub-networks (e.g., local area networks (LANs), wide area networks (WANs), or the like). Furthermore, computer system 100 may include a local network configured to interlink each of the computing devices comprising server infrastructure 110.

Furthermore, in some embodiments, computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the computer system 100 described in regard to FIG. 1, server infrastructure 110 may serve as a central authority which manages at least a portion of the computing data and actions performed in relation to the particular entity associated with server infrastructure 110. As will be described in further detail below in regard to FIG. 2, decentralized computing arrangements are also contemplated and disclosed herein such that server infrastructure 110 need not be centralized.

Figure 2:
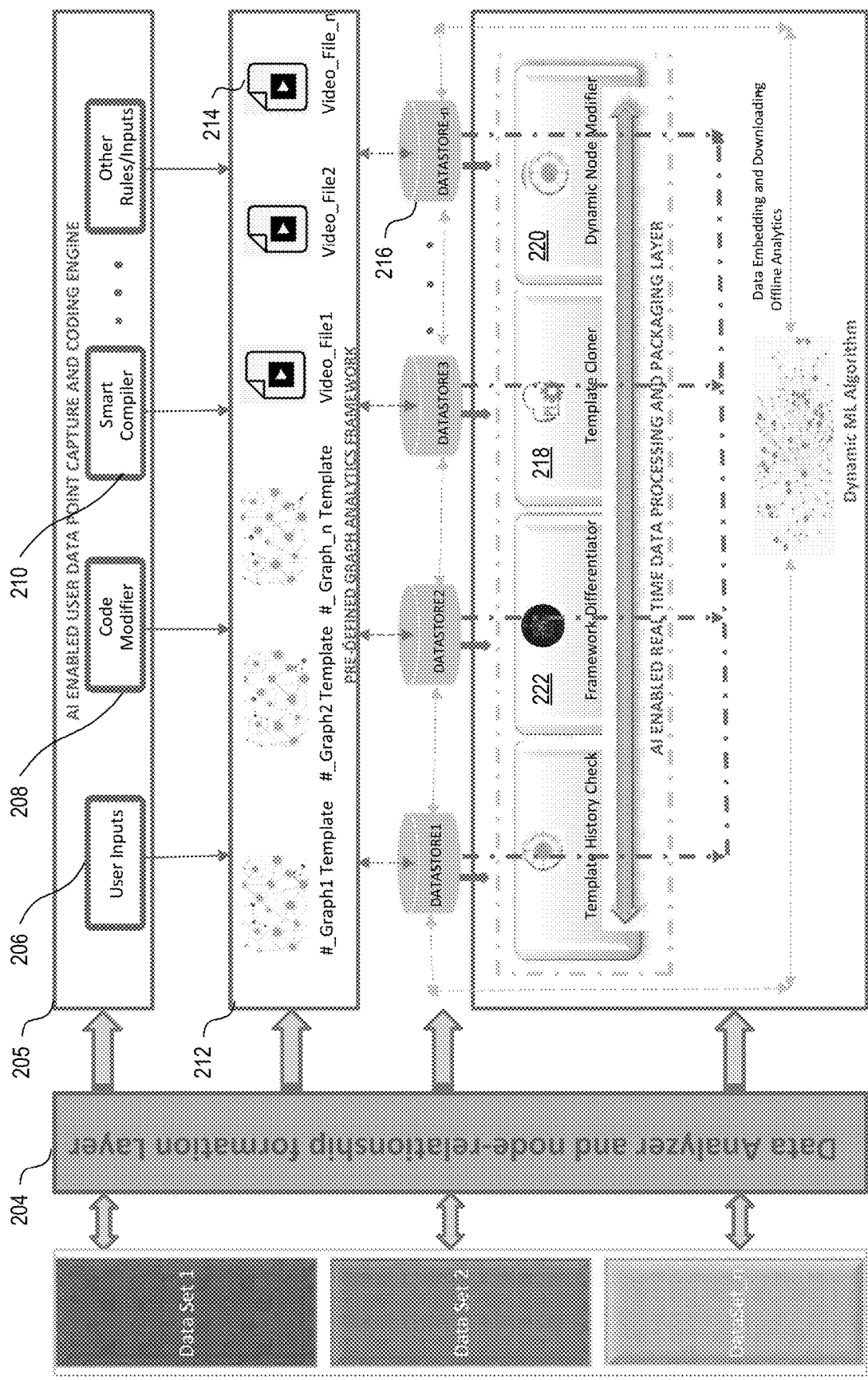
FIG. 2 depicts an illustrative example of a system in accordance with one or more illustrative aspects described herein.

Referring to FIG. 2, a novel system is illustrated for a vendor-agnostic graph analytics engine that uses a cognitive AI engine, which is built upon a BERT-based (bidirectional encoder representations from transformers) AI transformer, to generate dynamic nodes in a graph using templates and hashing by logical groups. The illustrative graphing framework system 200 comprises a data analyzer and node-relationship formation layer 204 configured to extract metadata from a dataset (e.g., dataset1, dataset2, dataset3 as illustrated in FIG. 2 with one or more dynamic nodes and/or static nodes) and a cognitive smart AI engine 205 that uses at least that extracted metadata to identify nodes and relationships in the dataset. Meanwhile, one or more data stores 216 may store one or more predefined graph-analytics templates that a dynamic template (or node) modifier 220 may match with/identify to an appropriate dataset corresponding to the graph-analytics template. The dynamic template (or node) modifier 220 may then modify the matched/corresponding graph-analytics template (e.g., templates, graph templates, dynamic templates, and the like).

The cognitive smart AI engine 205 uses a smart compiler 210 to identify nodes and relationships in the dataset using the metadata. For example, the engine 205 may analyze data set 1 to find that it comprises customer information including first names, last names, account numbers, mailing address, and other metadata. In a simplistic example, different customer nodes with the same mailing address may be identified as having a relationship—e.g., a common household. In a more sophisticated example, the cognitive smart AI engine 205 comprises a natural language processing (NLP) engine configured to clone and assist the dynamic template modifier for self-learning. In some example, the cognitive smart AI engine 205 may comprise a rules engine that further improves self-learning by taking into consideration a history of existing graph-analytics templates and user inputs 206. A code modifier 208 may update/modify code associated with a graph-analytics template 212 accordingly.

The smart BERT based transformer engine 217 may comprise a template history check module, framework differentiator 222, template cloner 218, and/or dynamic node modifier 220. The smart BERT based transformer engine 217 interacts with one or more data stores 216 to identify tool-specific syntax. And as the name suggests, the smart BERT based transformer engine 217 analyzes the dataset bidirectionally from right-to-left and left-to-right in realtime. The bidirectional manner of operation further improves the efficiency of the system 200. The smart BERT based transformer engine 217 may also convert syntax as appropriate for the data set being inputted and transform it using a smart compiler into a format readily comprehendible by the analytics framework.

Figure 3:
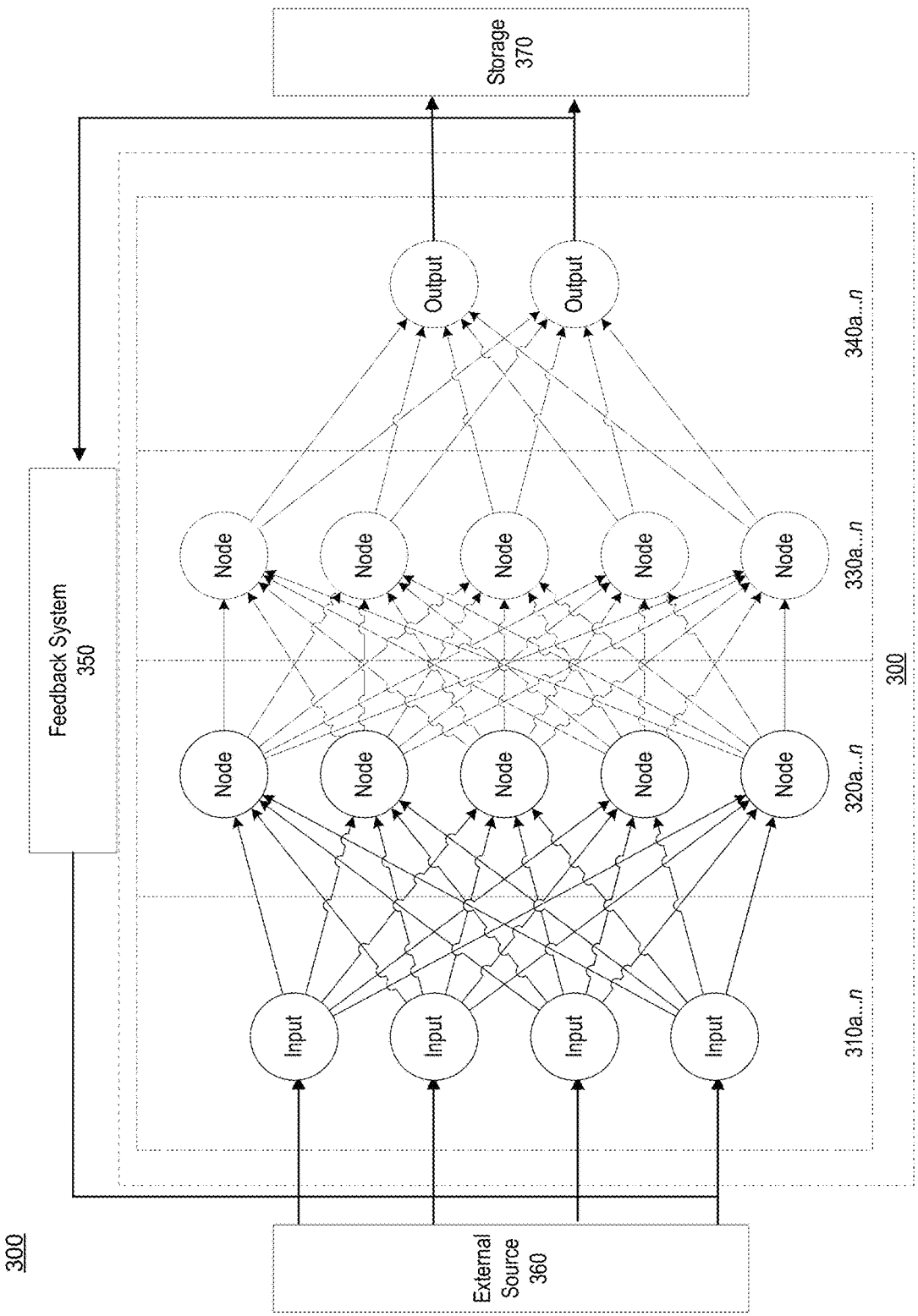
FIG. 3 shows an illustrative artificial neural network on which a machine learning algorithm may be executed in accordance with one or more examples described herein.

By way of example, FIG. 3 illustrates a simplified example of an artificial neural network 300 on which a machine learning algorithm may be executed. FIG. 3 is merely an example of nonlinear processing using an artificial neural network; other forms of nonlinear processing may be used to implement a machine learning algorithm in accordance with features described herein.

By way of background, a framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

In FIG. 3, each of input nodes 310a-n is connected to a first set of processing nodes 320a-n. Each of the first set of processing nodes 320a-n is connected to each of a second set of processing nodes 330a-n. Each of the second set of processing nodes 330a-n is connected to each of output nodes 340a-n. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310a-n may originate from an external source 360. Output may be sent to a feedback system 350 and/or to storage 370. The feedback system 350 may send output to the input nodes 310a-n for successive processing iterations with the same or different input data.

In one illustrative method using feedback system 350, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tan h function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses from exploits.

In one example, FIG. 3 depicts nodes that may perform various types of processing, such as discrete computations, computer programs, and/or mathematical functions implemented by a computing device. For example, the input nodes 310a-n may comprise logical inputs of different data sources, such as one or more data servers. The processing nodes 320a-n may comprise parallel processes executing on multiple servers in a data center. And, the output nodes 340a-n may be the logical outputs that ultimately are stored in results data stores, such as the same or different data servers as for the input nodes 310a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310a-n may be processed through processing nodes, such as the first set of processing nodes 320a-n and the second set of processing nodes 330a-n. The processing may result in output in output nodes 340a-n. As depicted by the connections from the first set of processing nodes 320a-n and the second set of processing nodes 330a-n, processing may comprise multiple steps or sequences. For example, the first set of processing nodes 320a-n may be a rough data filter, whereas the second set of processing nodes 330a-n may be a more detailed data filter.

The artificial neural network 300 may be configured to effectuate decision-making. As a simplified example for the purposes of explanation, the artificial neural network 300 may be configured to detect faces in photographs. The input nodes 310a-n may be provided with a digital copy of a photograph. The first set of processing nodes 320a-n may be each configured to perform specific steps to remove non-facial content, such as large contiguous sections of the color red. The second set of processing nodes 330a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 100 may then predict the location on the face. The prediction may be correct or incorrect.

The feedback system 350 may be configured to determine whether or not the artificial neural network 300 made a correct decision. Feedback may comprise an indication of a correct answer and/or an indication of an incorrect answer and/or a degree of correctness (e.g., a percentage). For example, in the facial recognition example provided above, the feedback system 350 may be configured to determine if the face was correctly identified and, if so, what percentage of the face was correctly identified. The feedback system 350 may already know a correct answer, such that the feedback system may train the artificial neural network 100 by indicating whether it made a correct decision. The feedback system 350 may comprise human input, such as an administrator telling the artificial neural network 300 whether it made a correct decision. The feedback system may provide feedback (e.g., an indication of whether the previous output was correct or incorrect) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to identify faces, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 100, such that the artificial neural network 100 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 100 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). For example, the machine learning algorithm 300 may be asked to detect faces in photographs. Based on an output, the feedback system 350 may indicate a score (e.g., 75% accuracy, an indication that the guess was accurate, or the like) or a specific response (e.g., specifically identifying where the face was located).

The artificial neural network 300 may be supported or replaced by other forms of machine learning. For example, one or more of the nodes of artificial neural network 300 may implement a decision tree, associational rule set, logic programming, regression model, cluster analysis mechanisms, B ay e si an network, propositional formulae, generative models, and/or other algorithms or forms of decision-making. The artificial neural network 300 may effectuate deep learning.

In another example, an unsupervised machine learning engine may use an autoencoder technique to detect anomalies within the graph. The autoencoder may be constructed with a number of layers that represent the encoding portion of the network and a number of layers that represent the decoding portion of the network. The encoding portion of the network may output a vector representation of inputs into the encoder network, and the decoding portion of the network may receive as input a vector representation generated by the encoding portion of the network. It may then use the vector representation to recreate the input that the encoder network used to generate the vector representation.

The autoencoder may be trained on historical data or feature vectors that are known to not be fraudulent. By training on non-fraudulent feature vectors, the autoencoder may learn how a non-fraudulent entity behaves. When the autoencoder encounters a feature vector that is different from the feature vectors it has trained on, the unsupervised machine learning engine may flag the feature vector as potentially fraudulent.

The autoencoder may be a variational autoencoder, in some examples. The variational autoencoder may include the components of the autoencoder. The variational autoencoder may also include a constraint on its encoding network that forces it to generate vector representations of inputs according to a distribution (e.g., a unit Gaussian distribution).

Figure 4:
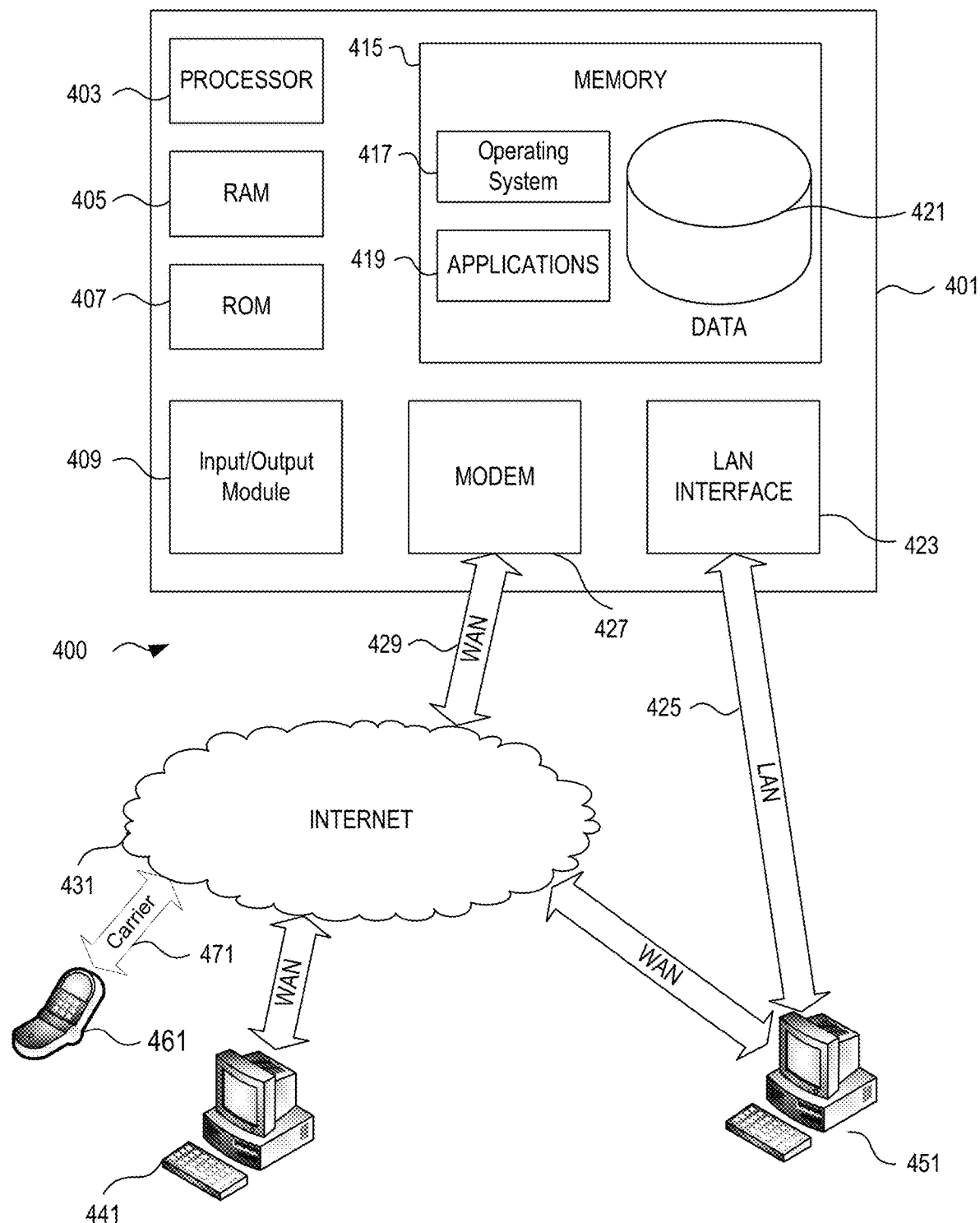
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, the systems and apparatus described herein may correspond to the computing device 401. A computer-readable medium (e.g., ROM 407) may store instructions that, when executed by the processor 403, may cause the computing device 401 to perform the functions as described herein.

Figure 5A:
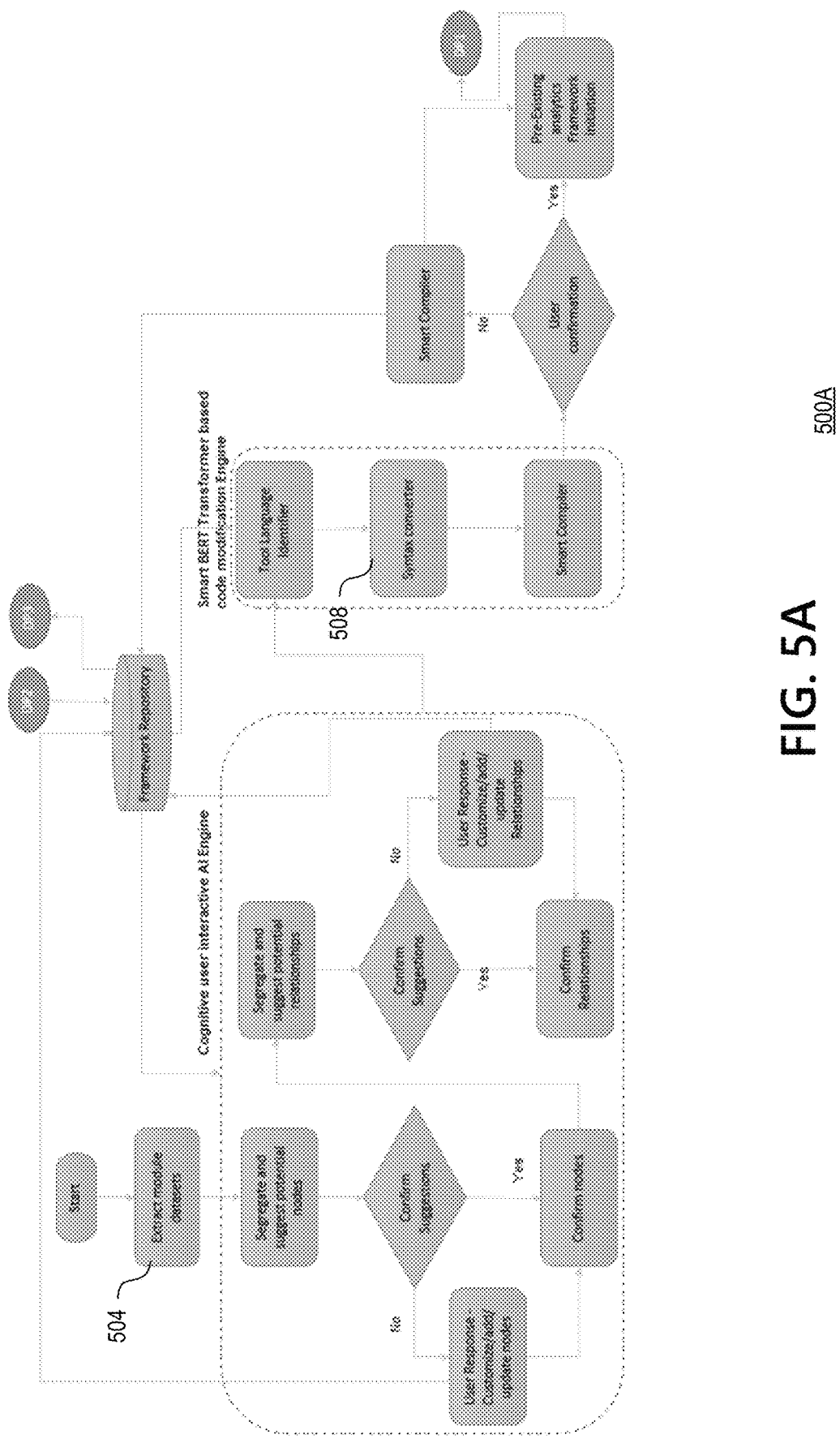
FIG. 5A and FIG. 5B (collectively referred to as "FIG. 5") depict an illustrative flow diagram in accordance with one or more illustrative aspects described herein.

Referring to FIG. 5A, a "Method for Dynamic AI Supported Graph-Analytics Self Learning Templates" embodiment is directed to a novel method and system 500A for a vendor-agnostic graph analytics engine that uses a cognitive AI engine, which is built upon a BERT-based (bidirectional encoder representations from transformers) AI transformer, to generate dynamic nodes in a graph using templates and hashing by logical groups. Predefined templates 212 for analytics may be stored in one or more data stores 216. These templates may be hashed to logically group them for quick extraction and other benefits. The templates 212 may include dynamic nodes given that logical aspects of data analysis remain constant even though their syntaxes and coding languages changes. Moreover, these features are in consideration of prominent industry domains and regular analytical requirements. The data analyzer and node-relationship layer 204 may extract 504 module datasets from a plurality of datasets. The smart AI engine 205 may identify the nodes and relationships from given these datasets and use customizable interactive user sessions 206 at various steps in the overall process to modify actions.

Referring to FIG. 5, in one embodiment, the smart AI engine uses a smart (Bidirectional Encoder Representations from Transformers) BERT based transformer engine 217 that identifies the tool-specific language, then causes the system 200 to modify the template code to synchronize it with tool-specific code for seamless template adoption by the tool in use. The graph-analytics template may be further modified with the benefit of a syntax converter 508 and/or smart compiler to enable dynamic support for different dataset formats. A dynamic template (and node) modifier 220 enables the relevant template selection or modification. Moreover, it enables the data to be embedded for the customized graph to be downloaded for offline analytics without the tool in defined format, in some embodiments. The dynamic template modifier 220 may use a natural language processing (NLP) engine to, inter alia, clone frameworks and otherwise assist with the functions of the dynamic template modifier.

For example, metadata captured from the data analysis may be used to identify relevant existing graph templates, modify existing templates with underlying coding efforts minimized, and dynamic code adoption with the help of the cognitive AI engine to identify relevant nodes and entities, and syncing up (e.g., matching) the pre-defined code template with tool-specific syntaxes. The pre-defined graph nodes may be hashed for logical grouping, ease of access, and are dynamic in nature to be modified based on change in requirement parameters. These customized/tailored graph-analytics templates may be developed with reduced coding development efforts with no control mismatches. And the development time is reduced since there is not a need for interrogation of the controls/elements. Moreover, application integration is faster and/or more efficient due to customized template solution which is adaptable to any graphing tool. Thus, less code maintenance of scripts.

In another example, graph-analytics templates may be hashed for logical grouping. As a result, execution time is noticeably reduced because API execution does not require interaction and navigation with front end application or their controls/elements.

For example, the framework system 200 may provide a user with a self-service customization option to create either tailored or auto-build templates. The auto-build templates may interface with the smart BERT based transformer engine 217, which includes a template history check module, framework differentiator 222, template cloner 218, and dynamic node modifier 220. For example, the system 200 includes intelligence in detecting new rules and dynamically building the rules in a rules engine (e.g., smart AI engine 205) taking into consideration the history of existing graph-analytics templates and helps the framework in self learning.

Figure 5B:
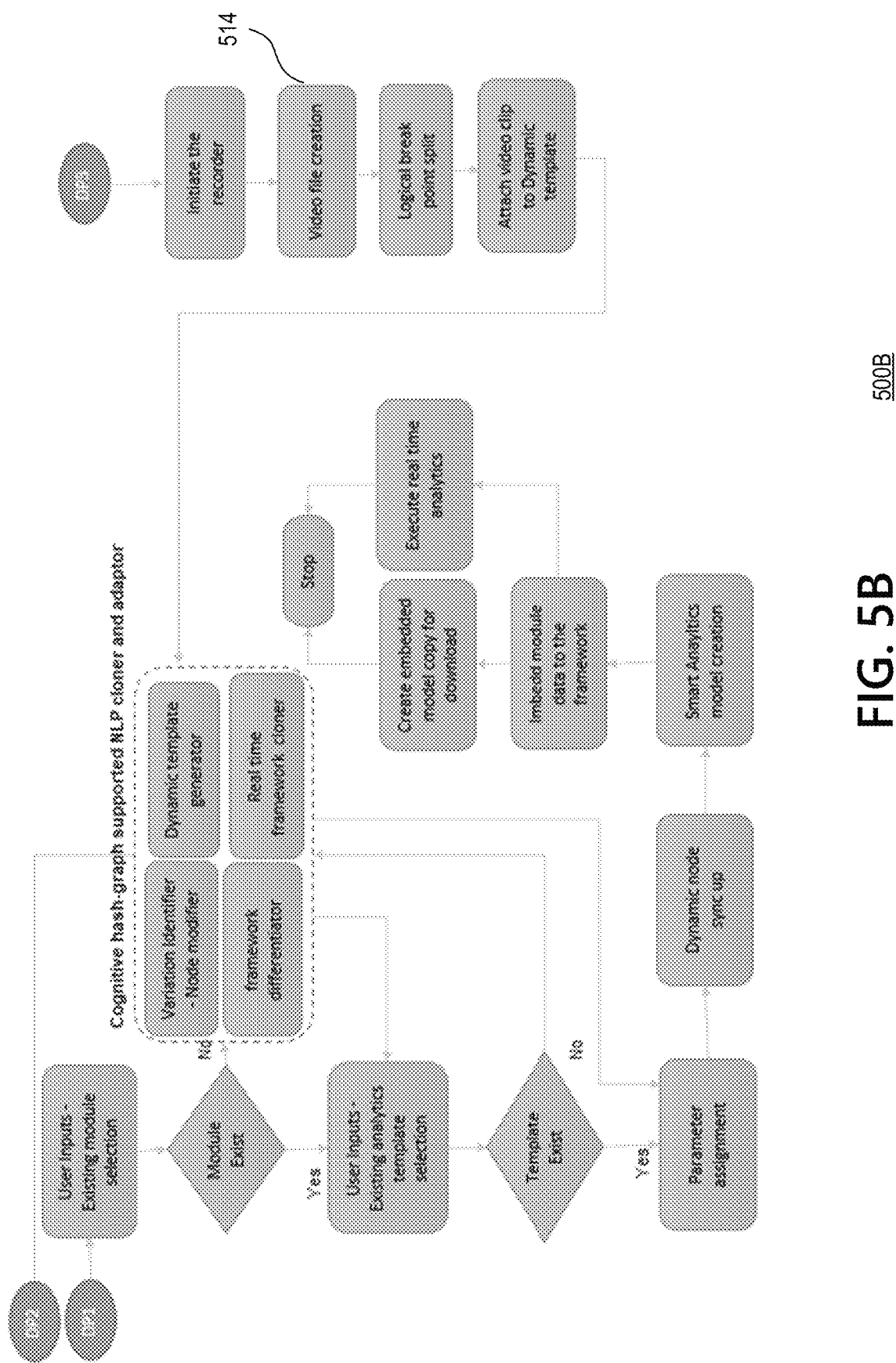

Referring to FIG. 5B, a "Method for Dynamic AI Supported Graph-Analytics Self Learning Templates (Smart Guided Video Media)" embodiment includes separate/numerous steps 500B to generate a novel, smart guided video media with logical breakpoints enabling explainable AI for audit and troubleshooting. This smart guided video may use a novel logical grouping of nodes in the graph to generate an actual video media that explains the evolution of the outputted results of the AI/BERT transformer engine 217 so that the framework is self-serviceable and auditable for AI bias.

In one example, a sub-system of modules (e.g., 205, 217) may comprise a dynamic template modifier and a cognitive smart artificial intelligence (AI) engine including a graph. Such a sub-system is configured to identify a graph-analytics template from among a plurality of graph-analytics templates stored in one or more data stores 216. The identified graph-analytics template is associated with a smart guided video 214 generated by an appropriately configured video file creation module.

In one example, the system 200 may initiate a recorder that captures the necessary information about the formation of a graph associated with the AI engine. The recorder assists in generating a media file that steps through formation of the graph, which is used by a cognitive smart AI engine, for the identified graph-analytics template. A media file creation module may insert in an automated manner, a plurality of logical breakpoints in the media file. The media is thus smart guided. Notably, the smart guided video 214 comprises logical breakpoints that enable AI auditing and troubleshooting of the cognitive smart AI engine. In some examples the dynamic template modifier of the AI auditing system may perform a dynamic node sync up before (or alternatively, concurrent with) creating a smart analytics model.

For example, smart guided videos 214 may have logical breakpoints. Those logical breakpoints and graph-analytics template creation help new users to efficiently understand functionally and technically. The framework repository (e.g., data store 216) may provide the data for the creation of smart guided videos 214. Thus, smart guided video (e.g., a mp3 file) may be created 514 contemporaneously with when the graph-analytics template is created/modified. One or more videos may be attached to the dynamic, graph-analytics template. For example, the smart guided videos may be sent to a cognitive hash-graph supported NLP cloner and adapter comprising a variation identifier-node modifier, dynamic template generator, framework differentiator 222, and real-time framework cloner 218. The cognitive hash-graph supported NLP cloner and adapter may provide a user with one or more smart guided videos 214 for guidance when the system 200 desires user input for existing graph-analytics templates, such as modifying/updating them or creating them for particular modules. The cognitive hash-graph supported NLP cloner and adapter may also provide guidance to a user when parameter assignments are desired for dynamic node sync up leading up to smart analytics model creation.

For example, the video media file (e.g., smart guided videos 214) may automatically explain formation of the graph and/or how nodes in the graph are logically grouped. In some examples, the smart guided video may include a visual explanation (e.g., step-by-step) of an AI transformer associated with the graph and/or of the sub-system with the cognitive smart AI engine. In yet other examples, the smart guided media may comprise an animated slideshow but without audio; in other examples, the animated slideshow may include audio.

Figure 6:
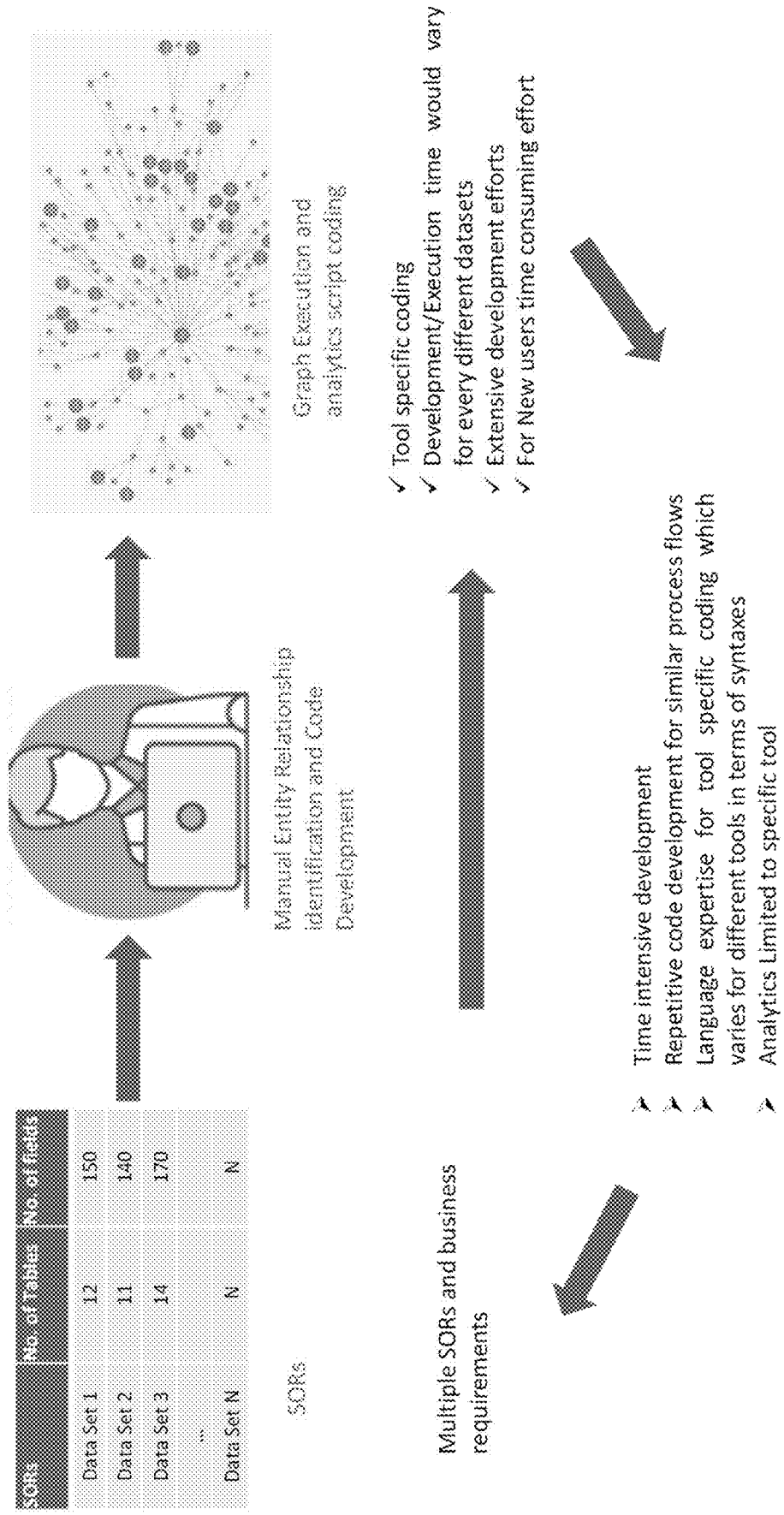
FIG. 6 shows an illustrative workflow involving manual supervisory input in accordance with one or more illustrative aspects described herein.

FIG. 6 shows an illustrative workflow 600 involving manual supervisory input in accordance with one or more illustrative aspects described herein. In some examples where graph-analytics templates are not available/offered, the workflow/state process may include systems of records (SORs) being manually coded by a person using tool specific coding that consumes extensive development time for every different dataset. And when multiples SORs exist with differing business requirements, the process can be time intensive and require repetitive code development for similar process flows. And the analytics may be limited to specific tools. In contrast, FIG. 7 illustrates a high-level workflow in accordance with novel aspects disclosed herein.

Figure 7:
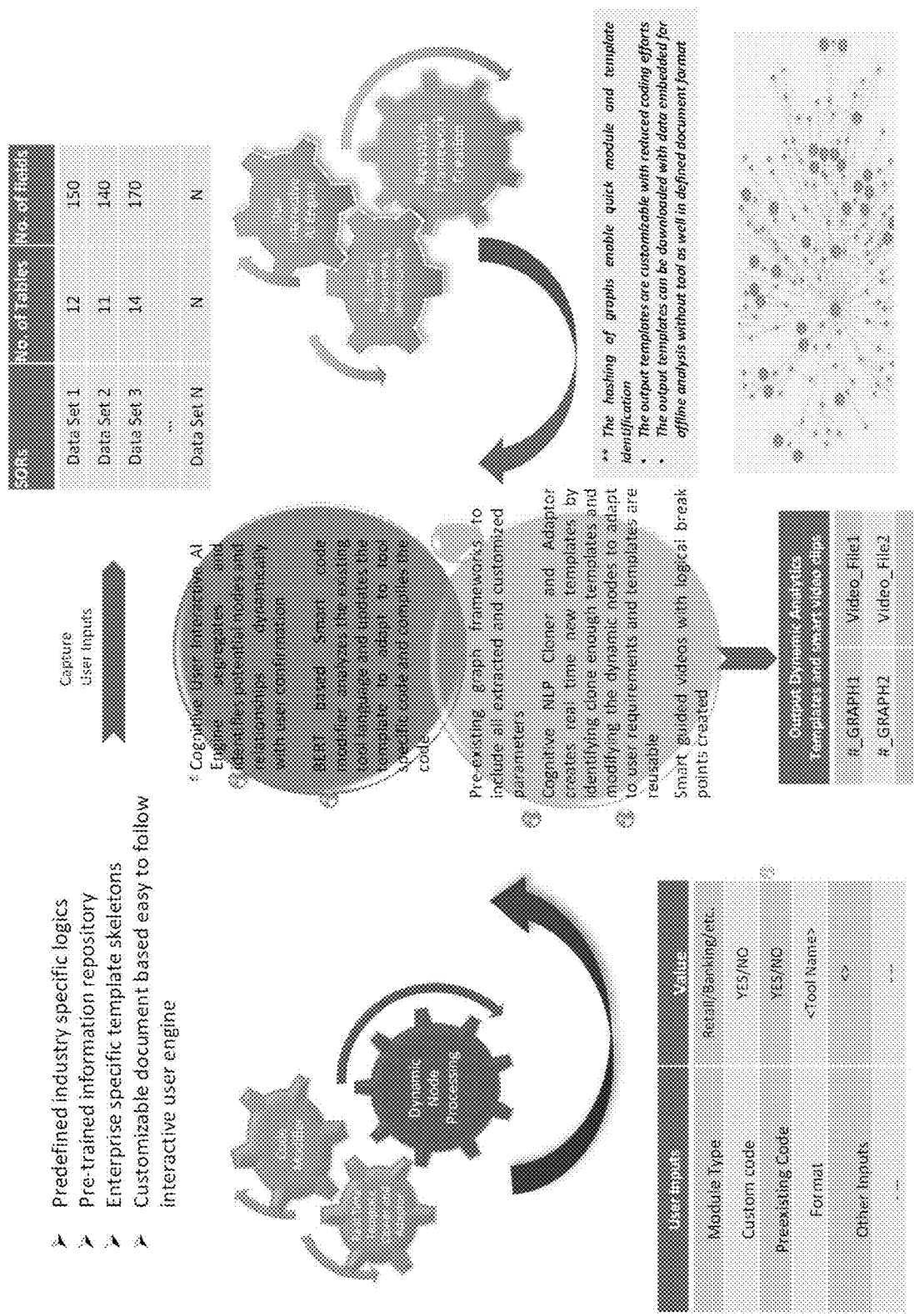
FIG. 7 shows an illustrative self-learning workflow in accordance one or more illustrative aspects described herein.

FIG. 7 shows an illustrative self-learning workflow 700 in accordance one or more illustrative aspects described herein. The system 200 receives one or more inputs and/or modules, such as predefined industry specific logic, pre-trained information repository, enterprise specific template skeletons, and/or customizable document-based easy-to-follow interactive user engines. Example of user inputs with their illustrative corresponding values may include: module type with a value of Retail/Banking/etc.; custom code with a Boolean value of yes or no; preexisting code with a Boolean value of yes or no; format with a value corresponding to the tool name; and other inputs. Meanwhile, the system of records that provide the one or more data sets may contain any number of tables with any number of fields, such as illustrated in FIG. 7. The resulting corpus of data is queried and analyzed with a cognitive smart AI engine 205 to segregate and identify potential nodes and relationships dynamically with user confirmation/input 206. The engine 205 may include a BERT based smart code modifier that analyzes the existing tool language and updates a template to adapt to tool specific code, and/or compiles the code.

Some enhancements include hashing of graphs to enable quick module and template identification. In some examples, the output templates are customizable with reduced coding efforts. And the output templates may be downloaded with data embedded for offline analysis without tool as well in defined document format.

The pre-existing graph framework may include a plurality of extracted and customized parameters. A cognitive NLP cloner and adaptor may create real-time, new templates by, inter alia, identifying clone enough templates, modifying the dynamic nodes to adapt to user requirements, and wherein the templates are reusable. The system 200 may also create smart guided videos with logical break points. In one example, the system 200 may output dynamic graph-analytics templates with corresponding smart guided videos (e.g., video clips) as illustrated in FIG. 7.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An artificial intelligence (AI) auditing system comprising:
at least one processor;
a non-transitory computer-readable medium storing computer-executable instructions;
a sub-system configured to identify, by executing the computer-executable instructions, a graph-analytics template from a plurality of graph-analytics templates stored in one or more data stores, wherein the sub-system comprises a dynamic template modifier and a cognitive smart artificial intelligence (AI) engine comprising a graph; and
a video file creation module configured to generate, by executing the computer-executable instructions, a smart guided video and associate the smart guided video with the identified graph-analytics template,
wherein the smart guided video comprises logical breakpoints enabling AI auditing and troubleshooting of the cognitive smart AI engine.

2. The system of claim 1, wherein the generating the smart guided video by the video file creation module comprises configuring the video file creation module to:
create a video media file that automatically explains formation of the graph.

3. The system of claim 2, wherein the generating the smart guided video by the video file creation module comprises configuring the video file creation module to:
logically group nodes in the graph.

4. The system of claim 2, wherein the smart guided video comprises a step-by-step visual explanation of an AI transformer associated with the graph.

5. The system of claim 1, wherein the smart guided video comprises a step-by-step visual explanation of the sub-system comprising the cognitive smart AI engine.

6. The system of claim 1, wherein the video file creation module comprises further computer-executable instructions to cause the system to:
initiate a recorder;
generate the smart guided video, wherein the smart guided video explains formation of the graph;
insert a plurality of logical breakpoints in the smart guided video; and
associate the smart guided video to the identified graph-analytics template.

7. The system of claim 1, wherein the sub-system comprises a cognitive hash-graph supported NLP cloner and adapter, and wherein the smart guided video recommends a parameter assignment for smart analytics model creation.

8. The system of claim 7, wherein the dynamic template modifier performs a dynamic node sync up before the smart analytics model creation.

9. A system comprising:
at least one processor;
a non-transitory computer-readable medium storing computer-executable instructions;
a sub-system configured to identify, by executing the computer-executable instructions, a graph-analytics template from a plurality of graph-analytics templates stored in one or more data stores, wherein the sub-system comprises a dynamic template modifier and a cognitive smart artificial intelligence (AI) engine comprising a graph; and a media file creation module configured to generate, by executing the computer-executable instructions, a smart guided media file and associate the smart guided media file with the identified graph-analytics template, wherein the smart guided media file comprises logical breakpoints enabling AI auditing and troubleshooting of the cognitive smart AI engine.

10. The system of claim 9, wherein the smart guided media file comprises a mp3 file format.

11. The system of claim 9, wherein the smart guided media file comprises an animated slideshow without audio.

12. The system of claim 9, wherein the media file creation module comprises further computer-executable instructions to cause the system to:
initiate a recorder;
generate the smart guided media file, wherein the smart guided media file explains formation of the graph;
insert a plurality of logical breakpoints in the smart guided media file; and
associate the smart guided media file to the identified graph-analytics template.

13. The system of claim 12, wherein the smart guided media file comprises a step-by-step explanation of the sub-system comprising the cognitive smart AI engine.

14. The system of claim 9, wherein the generating the smart guided media file by the media file creation module comprises configuring the media file creation module to logically group nodes in the graph.

15. The system of claim 9, wherein the smart guided media file comprises a step-by-step visual explanation of an AI transformer associated with the graph.

16. A non-transitory computer-readable medium storing computer-executable instructions that, when executed by a processor, cause an artificial intelligence (AI) auditing system to:

identify, by the system, a graph-analytics template from a plurality of graph-analytics templates stored in one or more data stores;
initiate a recorder;
generate a smart guided media file that steps through formation of a graph, which is used by a cognitive smart AI engine, for the identified graph-analytics template;
insert, by a media file creation module in an automated manner, a plurality of logical breakpoints in the smart guided media file; and
associate the smart guided media file to the identified graph-analytics template, wherein the smart guided media file comprises logical breakpoints enabling AI auditing and troubleshooting of a cognitive smart AI engine.

17. The non-transitory computer-readable medium of claim 16, wherein the generating the smart guided media file comprises logically grouping nodes in the graph.

18. The non-transitory computer-readable medium of claim 16, wherein the generated smart guided media file comprises a step-by-step visual explanation of an AI transformer associated with the graph.

19. The non-transitory computer-readable medium of claim 16, wherein the generated smart guided media file comprises a step-by-step visual explanation of the cognitive smart AI engine.

20. The non-transitory computer-readable medium of claim 16, storing computer-executable instructions that, when executed by the processor, cause the AI auditing system to:
perform, by a dynamic template modifier communicatively coupled to the cognitive smart AI engine, a dynamic node sync up before a smart analytics model creation.

\* \* \* \* \*